United States Patent [19]

Gray

[11] Patent Number: 5,375,972
[45] Date of Patent: Dec. 27, 1994

[54] TURBINE STATOR VANE STRUCTURE

[75] Inventor: Robert E. Gray, Beavercreek, Ohio

[73] Assignee: The United States of America as represented by the Secretary of the Air Force, Washington, D.C.

[21] Appl. No.: 123,628

[22] Filed: Sep. 16, 1993

[51] Int. Cl.$^5$ ............................................. F01D 9/02
[52] U.S. Cl. ............................... 415/115; 416/231 R
[58] Field of Search ................. 415/115, 116, 914; 416/231 R, 231 B

[56] References Cited

U.S. PATENT DOCUMENTS

| | | | |
|---|---|---|---|
| 2,314,572 | 3/1943 | Chitz | 415/129 |
| 4,565,490 | 1/1986 | Rice | 415/114 |
| 4,740,138 | 4/1988 | Zaehring et al. | 415/48 |
| 4,815,928 | 3/1989 | Pineo et al. | 415/17 |
| 4,835,958 | 6/1989 | Rice | 60/39.05 |
| 4,856,961 | 8/1989 | McDow | 415/115 |
| 4,962,640 | 10/1990 | Tobery | 60/39.02 |
| 4,967,552 | 11/1990 | Kumata et al. | 60/39.75 |
| 4,991,390 | 2/1991 | Shah | 60/39.36 |
| 4,992,026 | 2/1991 | Ohtomo et al. | 416/97 R |
| 5,039,562 | 8/1991 | Liang | 427/276 |
| 5,062,262 | 11/1991 | Shekleton | 60/39.36 |
| 5,096,379 | 3/1992 | Stroud et al. | 416/97 R |

FOREIGN PATENT DOCUMENTS

| | | | |
|---|---|---|---|
| 993590 | 11/1951 | France | 415/115 |
| 195186 | 1/1958 | Netherlands | 415/115 |
| 774501 | 5/1957 | United Kingdom | 415/115 |

*Primary Examiner*—John T. Kwon
*Attorney, Agent, or Firm*—Bobby D. Scearce; Thomas L. Kundert

[57] ABSTRACT

A turbine stator vane structure is described which comprises an airfoil having a pressure side and a suction side and at least one duct of preselected size defined through the airfoil from the pressure side to the suction side thereof with preselected orientation with respect to the camberline of the airfoil for directing a predetermined portion of the turbine engine gas flow through the airfoil whereby the gas flow angle and momentum at the rotor inlet plane of the engine is selectively altered. A rotatable slotted sleeve may be included within each duct for selectively throttling flow therethrough.

5 Claims, 2 Drawing Sheets

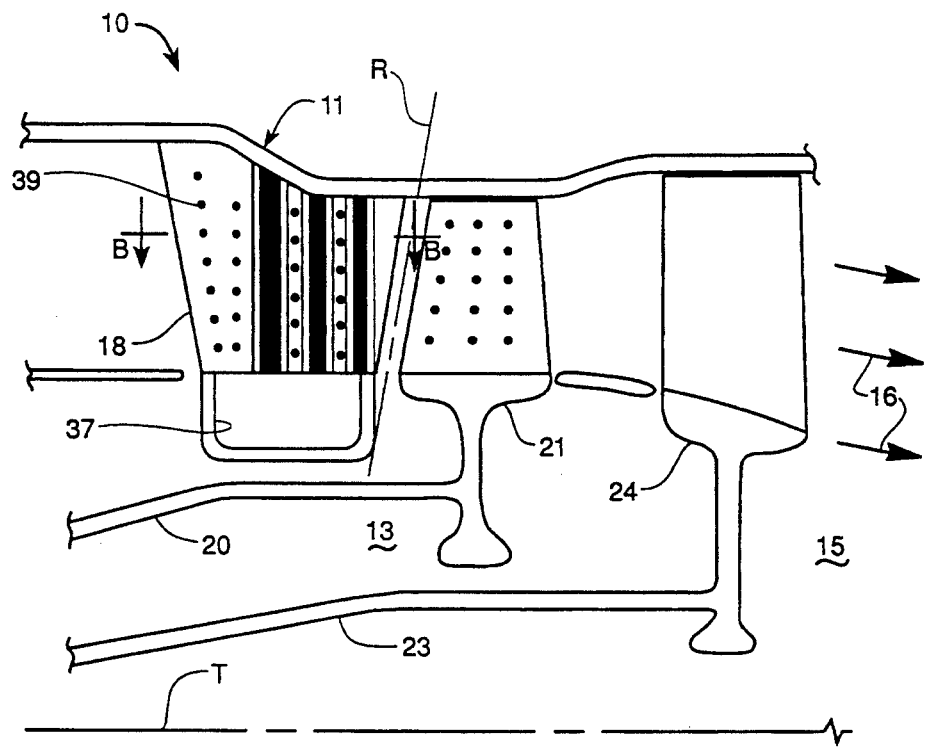
Fig. 1
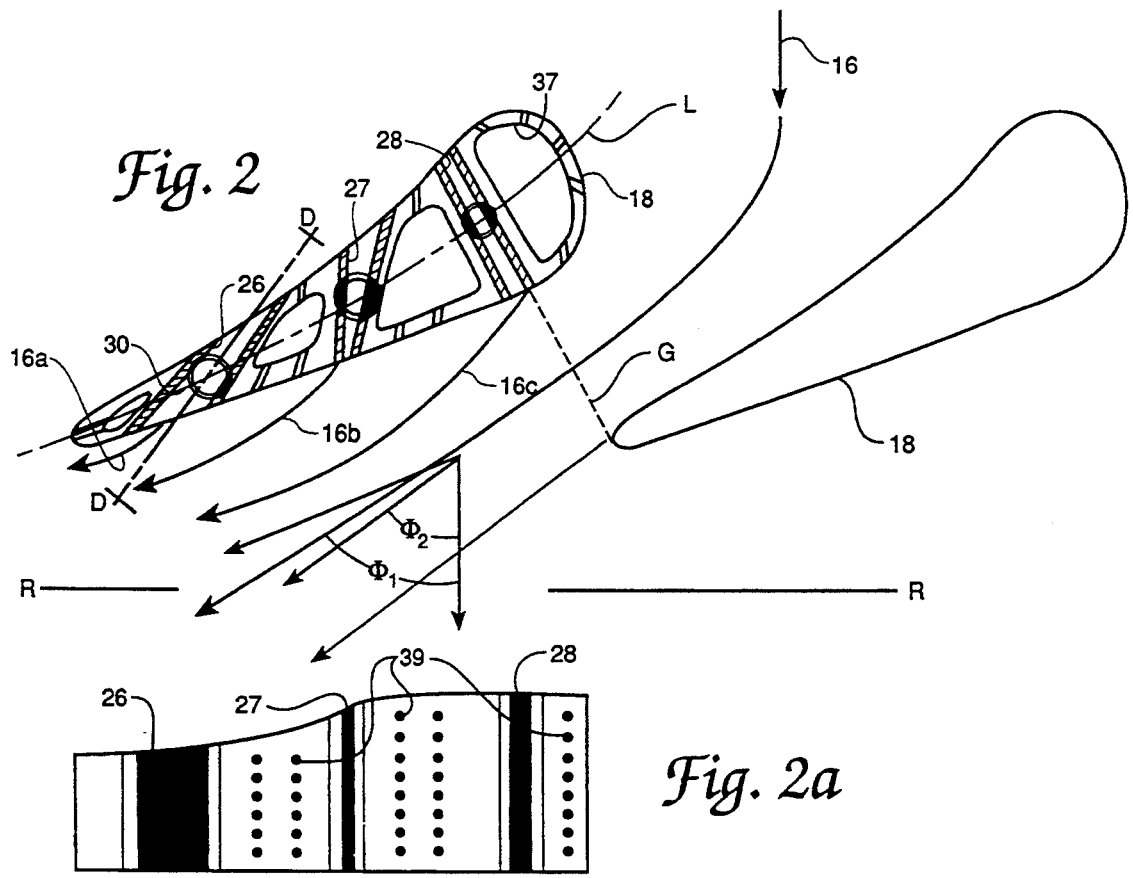
Fig. 2
Fig. 2a

TURBINE STATOR VANE STRUCTURE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gas turbine engine structures, and more particularly to an improved stator vane structure for a gas turbine engine providing additional control of power level and velocity diagram efficiency which may be demanded of aviation gas turbines, without using devices for mechanical variation of turbine stator geometry.

In existing turbine engine structures, additional control may typically be achieved by varying the corrected flow of the turbine by mechanically varying stator geometry either by pivoting the stator airfoils or by varying blockage of the stator flow passages with mechanical plugs.

The improved turbine stage structure of the invention yields control of the corrected flow by routing additional flow through internal intraflow ducts between the pressure and suction surfaces of the stator airfoils. The ducts are sized and oriented so that flow therethrough is re-introduced into the gas flow to the rotor in a preselected amount and momentum to produce a change in the main gas flow angle to the desired corrected flow.

The invention may find use in improving fuel efficiency of large fighter engines without sacrificing specific thrust when the engine is operated at maximum power, and in large gas turbine propulsion engines for high speed transport aircraft, where thrust levels required to maintain supersonic flight speeds require high levels of specific thrust, but range requirements demand low levels of specific fuel consumption.

It is therefore a principal object of the invention to provide an improved gas turbine engine structure.

It is a further object of the invention to provide an improved turbine stator airfoil structure for a gas turbine engine.

It is another object of the invention to provide an improved turbine structure for a gas turbine engine wherein the gaseous flow to the rotor is improved by directing a selected portion of the gaseous flow through the stator vanes.

These and other objects of the invention will become apparent as a detailed description of representative embodiments proceeds.

SUMMARY OF THE INVENTION

In accordance with the foregoing principles and objects of the invention, a turbine stator vane structure is described which comprises an airfoil having a pressure side and a suction side and at least one duct of preselected size defined through the airfoil from the pressure side to the suction side with preselected orientation with respect to the camberline of the airfoil, for directing a predetermined portion of the turbine engine gas flow through the airfoil whereby the gas flow angle and momentum at the rotor inlet plane of the engine is selectively altered. A rotatable slotted sleeve may be included within each duct for selectively throttling flow therethrough.

DESCRIPTION OF THE DRAWINGS

The invention will be more clearly understood from the following detailed description of representative embodiments thereof read in conjunction with the accompanying drawings wherein:

FIG. 1 is a partial view in axial section of the turbine section of a gas turbine engine incorporating the invention;

FIG. 2 is a cross-sectional view of the stator airfoil of the invention taken along line B—B of FIG. 1 in a plane perpendicular to the plane of FIG. 1;

FIG. 2a is a cross-sectional view of the FIG. 2 stator airfoil taken along the camberline thereof.

DETAILED DESCRIPTION

Figure 3:
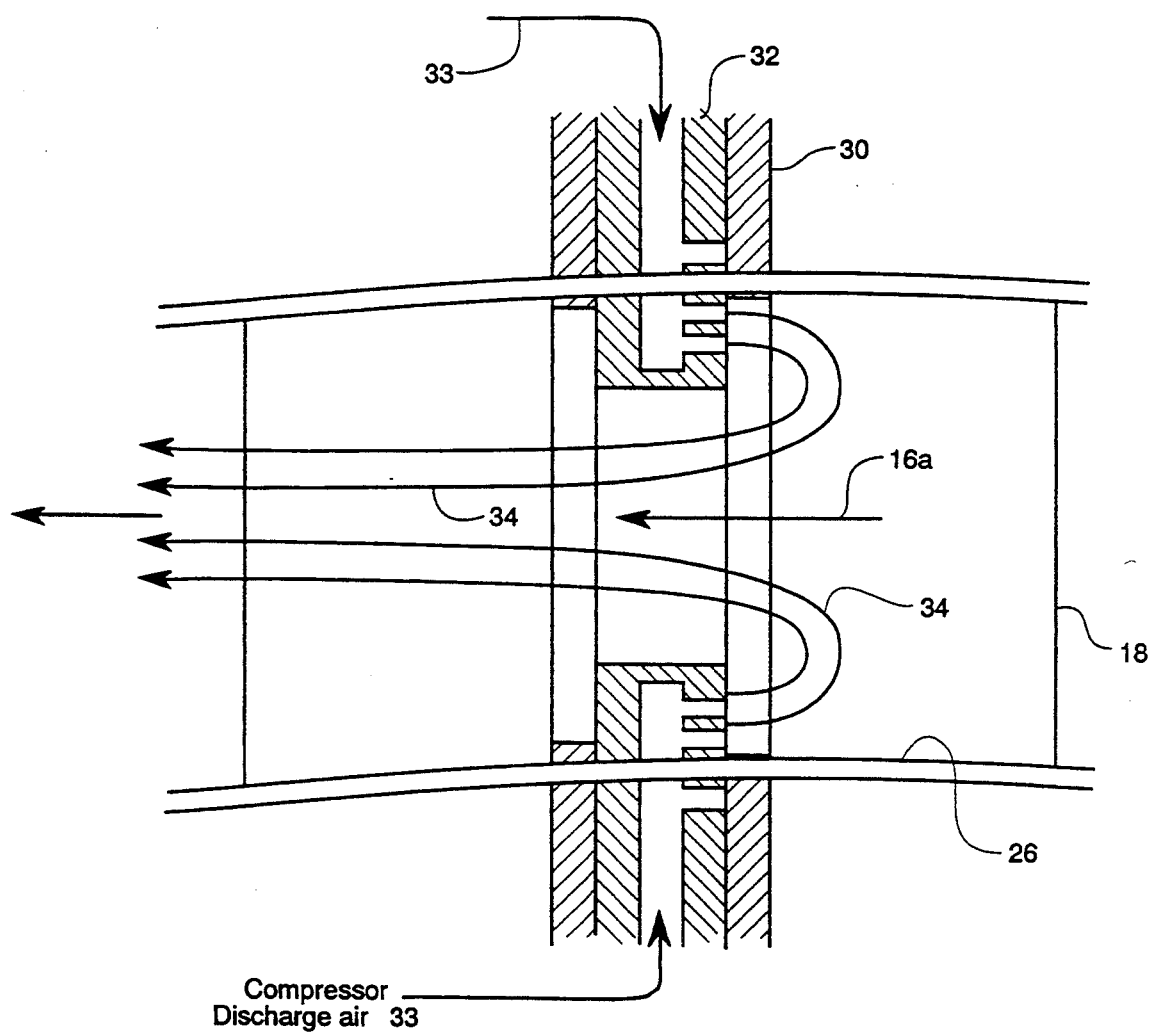
FIG. 3 is a cross-sectional view of the FIG. 2 airfoil taken along line D—D in a plane perpendicular to the plane of FIG. 2.

Referring now to the drawings, FIG. 1 shows a partial view in axial section of the turbine section of a gas turbine engine 10 incorporating the improved turbine stage according to the invention. Engine 10 may comprise a suitable supporting structure or housing 11 defining a preselected geometry for turbine region 13 and hot gas duct 15 for confining flow 16 of hot gaseous combustion products along thrust axis T. Turbine region 13 typically comprises a plurality of circumferentially disposed fixed stator airfoils 18, rotatable spool 20 supporting a plurality of high pressure turbine blades 21, and counterrotating spool 23 supporting a plurality of low pressure turbine blades 24. There may be an additional row of stator airfoils preceding counterrotating spool 23, depending upon the designed load distribution over rotatable spool 20 and counterrotating spool 23.

In conventional turbofan engine cycles, the operating points of the turbines, fans and compressors are described by corrected variables as the engine operating points are varied in altitude, power setting and flight Mach number. Since temperatures may be extreme in modern gas turbines, and fuel/air ratios result in correspondingly greater vitiation of the engine core airflow, the working fluid may not be calorically perfect, i.e., $C_p$ may fail to be constant. Hence the effect of changes in heat capacity $C_p$ must be accounted for in dealing with turbine corrected flows.

In accordance with a governing principle of the invention, modulation of the physical mass of flow 16 and effective area factors associated with gaseous flow parameters at rotor inlet plane R (shown by broken line) is achieved without provision for mechanical movement of airfoils 18 or use of variable position plugs. Reference is now made additionally to FIG. 2, which is a sectional view of airfoil 18 as viewed along line B—B of FIG. 1 in a plane perpendicular to the plane of FIG. 1. FIG. 2a shows a portion of airfoil 18 as viewed along centerline L (camberline) thereof. Modulation of flow 16 is achieved through any desired plurality (preferably 3 to 5) of ducts 26,27,28 of preselected size defined through each airfoil 18 along respective axes disposed at preselected orientations with respect to centerline L, which direct metered amounts 16a,b,c of flow 16 from the upstream pressure side to the downstream suction side of airfoils 18. The objective is to obtain modulation of the turbine corrected flow through control of the stator exit gas angle Φ of flow 16 at plane R.

A critical feature of the invention is the sizing and arrangement of ducts 26–28 to control the mass flow and momentum of cross flow exiting into the hot gas path downstream of throat or gage plane G between adjacent airfoils 18 in the stator cascade. Ducts 26–28 are sized and directed to modify the momentum distribution downstream of throat G so that a particular decrease in mean angle $\Phi$ (e.g., from $\Phi_1$ to $\Phi_2$) of flow 16 at plane R is produced when a particular additional flow is metered through ducts 26–28. Stator airfoils 18 typically are about 1.0 to 2.0 inches in centerline width, commonly known as airfoil thickness, and about 3.0 to 6.0 inches in centerline length L, commonly known as the camberline length. Ducts 26–28 will therefore be in the range of about 0.8 to 1.6 inches wide by about 1.0 to 2.0 inches long, or in the range of about 1.1 to 2.0 inches in diameter, and arranged in sufficient multiplicity so as to direct through airfoil 18 about 12% to 15% of flow 16 impinging On the pressure side of airfoil 18. Orientation of a duct with respect to centerline L may depend on location of the duct between the leading and trailing edges of the airfoil, but will be disposed at an angle to centerline L in the range of about 45° to 90°.

Modulation of the turbine corrected flow using the invention provides a smooth variation from minimum to maximum flow. The flow through ducts 26–28 may be controlled by including rotatable sleeves 30 within ducts 26–28 as suggested in FIGS. 2 and 3. Each sleeve 30 may be slotted so that by rotation thereof, each duct 26–28 may be throttled from fully closed to fully open.

The walls of ducts 26–28 may be cooled, and the flow therethrough modulated by incorporating optional fluidic air injection nozzles 32 in airfoils 18 for delivering discharge air 33 from the compressor region of engine 10 to each duct and directing air flow 33 flow counter of duct intraflow gas 16a. FIG. 3 shows the general arrangement of nozzles 32. The extent of protrusion of each nozzle 32 into the corresponding duct carrying intraflow gas (16a in FIG. 3) is variable so that the regions of cool air entrained in the separated flow domains within the duct, and the corresponding effective discharge area of each duct, may be modulated. The compressor discharge air flow 33 through nozzles 32 is small relative to flow 16 and has a primary purpose of inducing domains of separated flow, which entrain relatively cooler compressor discharge air along the surfaces defining ducts 26–28 and the suction side of airfoil 18. As suggested by FIG. 3, the separated flow domains consist of regions of relatively low kinetic energy, reverse flow 34. The curvature of the streamlines in these regions displaces flow in each duct, which results in contraction of the effective flow area of the ducts.

It can be shown that for a substantially constant Mach number condition at plane R, the corrected flow of the turbine stage may only be altered by changing the annular flow area $A_n$ at reference plane R and/or angle $\Phi$ at plane R. In the fixed geometry, variable area turbine, both $A_n$ and the stator gaging angle, determined by throat G, are held fixed. The required variation in angle $\Phi$ is obtained by the metering flow from the pressure side of airfoil 18 through ducts 26–28 to points downstream of throat G.

It may be seen from FIG. 2 that momentum conservation considerations require that the main gas path flow be deflected from its undisturbed gas angle $\Phi_1$ to smaller gas angle $\Phi_2$. If flow 16 density, flow velocity, and total enthalpy are known at each point in the undisturbed main gas path flow field, then principles of conservation of energy, mass flow, and momentum may be used to determine the required flow at the exit of each duct to establish a new gas angle, $\Phi_2$. The new value of $\Phi_2$ establishes the new effective flow area at plane R.

Airfoils 18 may be fabricated using any known method, such as by casting, as might occur to the skilled artisan guided by these teachings, and may be structured to include internal cooling flow passages 37 for conducting cooling airflow from the compressor region of engine 10 into contact with the internal surfaces defining the airfoil structure. A selected plurality of passageways 39 through the airfoil walls may provide surface film cooling to airfoil 18.

The invention therefore provides an improved turbine stator vane structure for a gas turbine engine. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A turbine stator vane structure comprising:
   (a) an airfoil having a pressure side and a suction side and being defined with respect to a central camberline of said airfoil;
   (b) at least one duct of preselected size defined through said airfoil from said pressure side to said suction side thereof along an axis disposed at preselected orientation with respect to said camberline of said airfoil, for directing through said airfoil a predetermined portion of the gas flow impinging on said pressure side of said airfoil; and
   (c) within each said duct a slotted sleeve, rotatable within each said duct between an open position at which flow through said duct is unrestricted and a closed position at which flow through said duct is blocked.

2. The stator vane structure of claim 1 comprising 3, 4 or 5 said ducts of preselected size defined through said airfoil along respective axes disposed at preselected orientations with respect to said camberline.

3. The stator vane structure of claim 1 wherein said ducts are sized to direct through said airfoil about 12% to 15% of the gas flow impinging on said pressure side of said airfoil.

4. The stator vane structure of claim 1 wherein said airfoil is about 1.0 to 2.0 inches in thickness, and about 3.0 to 6.0 inches in camberline length.

5. The stator vane structure of claim 1 wherein said ducts are disposed at an angle of about 45° to 90° to said camberline.

* * * * *